United States Patent
Dilhan

(10) Patent No.: US 9,004,092 B2
(45) Date of Patent: Apr. 14, 2015

(54) DEVICE FOR DRAINING A TANK OF A SPACEBORNE SYSTEM

(75) Inventor: Denis Dilhan, Auterive (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 162 days.

(21) Appl. No.: 13/469,425

(22) Filed: May 11, 2012

(65) Prior Publication Data

US 2012/0286099 A1    Nov. 15, 2012

(30) Foreign Application Priority Data

May 13, 2011   (FR) ...................... 11 01461

(51) Int. Cl.
| | |
|---|---|
| *F16K 17/14* | (2006.01) |
| *F16L 41/06* | (2006.01) |
| *B64G 1/40* | (2006.01) |
| *F16K 24/00* | (2006.01) |
| *F17C 13/00* | (2006.01) |
| *F42B 3/00* | (2006.01) |
| *F42B 12/04* | (2006.01) |
| *F16K 17/40* | (2006.01) |
| *F16K 17/38* | (2006.01) |

(52) U.S. Cl.
CPC . *F16L 41/06* (2013.01); *B64G 1/40* (2013.01); *F16K 24/00* (2013.01); *F17C 13/00* (2013.01); *F42B 3/00* (2013.01); *F42B 3/006* (2013.01); *F42B 12/04* (2013.01); *F16K 13/06* (2013.01); *F16K 17/38* (2013.01)

(58) Field of Classification Search
USPC .............. 137/68.13; 220/261; 222/81, 82, 5
See application file for complete search history.

(56) References Cited

U.S. PATENT DOCUMENTS

| | | | | |
|---|---|---|---|---|
| 3,494,370 | A | * | 2/1970 | Wahl et al. ................. 137/68.13 |
| 3,709,250 | A | | 1/1973 | Bates |
| 4,245,660 | A | * | 1/1981 | Rozniecki ................. 137/68.13 |
| 4,619,284 | A | | 10/1986 | Delarue et al. |
| 7,032,778 | B2 | * | 4/2006 | Bock et al. ........................ 222/3 |

FOREIGN PATENT DOCUMENTS

| | | |
|---|---|---|
| FR | 2 077 835 A1 | 11/1971 |
| FR | 2 561 743 A1 | 9/1985 |
| JP | 2007 170544 A | 7/2007 |

OTHER PUBLICATIONS

French Search Report, dated Dec. 20, 2011, from corresponding French application.

* cited by examiner

*Primary Examiner* — Kevin Lee
*Assistant Examiner* — P. Macade Nichols
(74) *Attorney, Agent, or Firm* — Young & Thompson

(57) ABSTRACT

A device (1) for draining a tank of fluid under pressure pertaining to a space system includes a pyrotechnic actuator that is suitable to perforate a conduit (2) in fluid communication with the tank, the device including a collar (4) that is suitable to enclose the conduit, the collar bearing:
  a pyrotechnic cartridge (5) for perforation, oriented radially towards the conduit (2), and
  an anvil (11), diametrically opposed to the cartridge in relation to the conduit, that is suitable to collect debris generated by the perforation.

14 Claims, 1 Drawing Sheet

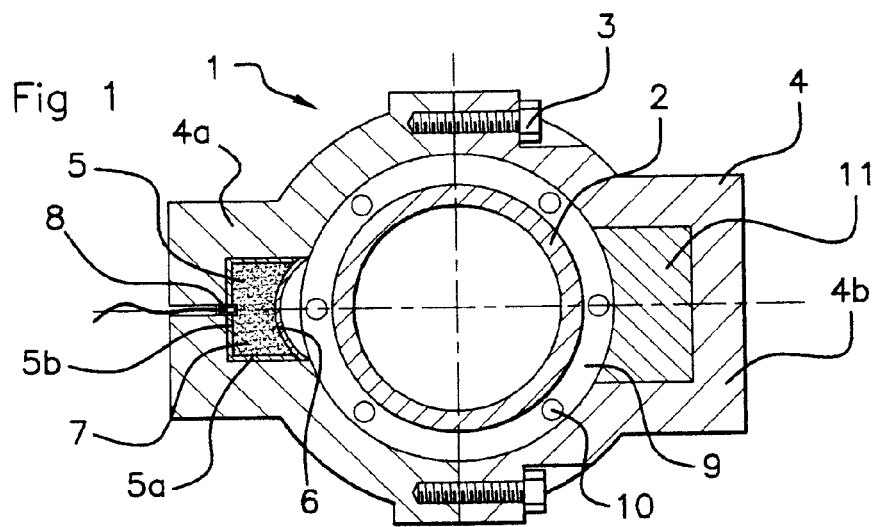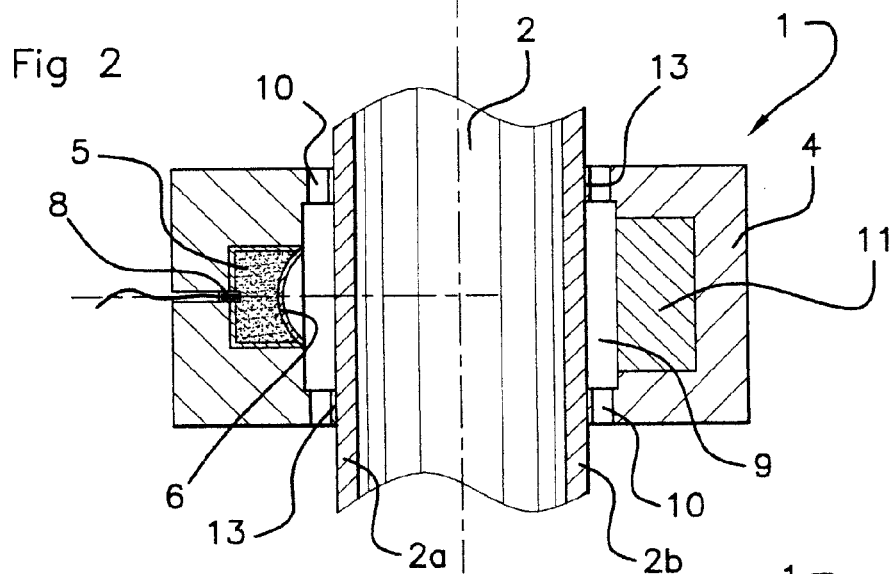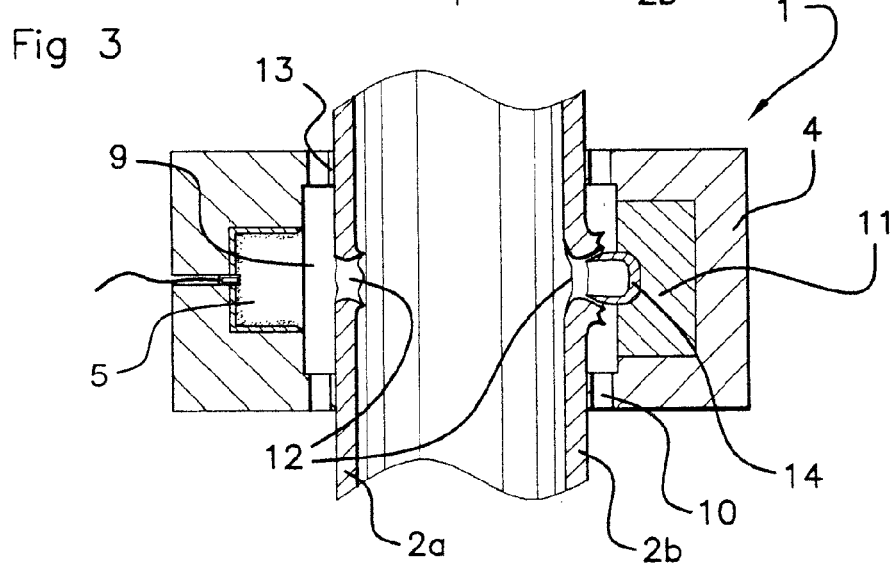

DEVICE FOR DRAINING A TANK OF A SPACEBORNE SYSTEM

BACKGROUND OF THE INVENTION

The invention concerns a device for draining a tank pertaining to a space system.

DESCRIPTION OF THE RELATED ART

In the field of space vehicles, in particular for non-reusable space vehicles such as artificial communication satellites or observation satellites for example, when the satellite comes to the end of its operational life it is mandatory to free the orbit being used and to deactivate the satellite at the end of its life.

In the remainder of the text the term 'satellite' is used (without further precision) to designate more generally any space vehicle likely to reach the end of its operational life, in foreseeable manner or not, as a consequence of an incident or a breakdown, as the case may be.

Several processes are known for eliminating a satellite at the end of its life, for example the destruction of the satellite by combustion and/or fusion at the time of re-entry of said satellite into the terrestrial atmosphere (in general for satellites circulating in low orbit), or the placing of the satellite in a "graveyard" orbit for satellites placed in an orbit at higher altitude, such as the geostationary orbit at 35 786 km from the Earth. When a satellite, and more particularly a geostationary satellite, has reached the end of its operational life, the residual fuel in the tanks of the satellite is used to propel it towards an orbit, called a "junk" orbit or "graveyard" orbit, situated beyond the geostationary orbit. Once in this orbit, the satellite is deactivated, and in particular its tanks of fluid, both of propulsive fluids (propellants) and of pressurisation fluids (helium, nitrogen etc.), have to be drained, in order to avoid any risk of explosion in the event of an encounter with space debris. Likewise for a satellite in low orbit, once the de-orbiting acceleration has been applied it is advisable to drain its tanks, in order to avoid any risk of explosion, generating space debris, that is capable of being caused by the residual propellants at the time of combustion of the satellite upon re-entry into the atmosphere.

Several means are employed in order to implement this drainage. For example, it is possible to open the feed valves of the engines in order to allow the remainder of residual propellants to escape once the graveyard orbit has been attained or the de-orbiting acceleration has been applied. However, this solution is not satisfactory in the case of membrane tanks, the "pressurisation pocket" of which cannot be drained in this way, nor in the case of pressurisation tanks that are isolated from tanks of propellants after their pressurisation.

It is also possible to use pyrotechnic valves, such as those known from document FR2561743, placed for example on a drainage branch of the conduit(s) terminating at the tank, the pyrotechnic valve having the function of opening the drainage conduit. However, in addition to the problems posed by the reliability of these pyrotechnic valves, the service life of which does not exceed 8 to 10 years, whereas drainage is effected from 15 to 20 years or even more after the commissioning of the satellite, the implementation of drainage conduits and the fitting of suitable pyrotechnic valves are costly, both in terms of mass and in terms of complexity. Moreover, these conduits and these valves have to be provided specifically for each satellite right from the beginning of their design, and bring about additional difficulties when a modification is necessary in the installation of the tank or of its conduits.

SUMMARY OF THE INVENTION

The object of the invention is therefore to provide a draining device for a tank of fluid under pressure that does not exhibit the drawbacks of the known prior art.

The invention also aims to provide such a draining device that is easily adaptable on multiple platforms to various types of satellite and tank.

The invention aims, in addition, to provide such a device, the service life, the safety and the reliability of which are improved in comparison with the known devices.

The invention aims moreover to provide such a device that respects the new rules as regards limiting the generation of space debris.

The invention also aims to provide such a device, the unit cost of which can be greatly reduced in comparison with the known devices.

In order to do this, the invention provides a device for draining a tank of fluid under pressure pertaining to a space system, including a pyrotechnic actuator that is suitable to perforate a conduit in fluid communication with said tank, said device including a collar that is suitable to enclose said conduit, said collar bearing:
- a pyrotechnic cartridge for perforation, oriented radially towards the conduit, and
- an anvil diametrically opposed to the cartridge with respect to the conduit.

The draining device according to the invention can be adapted in this way to any type of tank, so long as the latter is equipped with a conduit. In particular, the device can be fitted onto a conduit for output of propellants to an engine, and/or onto a pressurisation conduit linking a tank for pressurisation fluid (helium, nitrogen etc.) to a "pressurisation pocket" of a tank for propellants. In this manner it is possible to deactivate the membrane tanks both from the pressurisation side and from the propellant side. The device according to the invention can be adapted to numerous sizes of conduits simply by implementing a collar adapted to the diameter of said conduits. Moreover, the draining device according to the invention does not require any specific adaptation such as drainage conduits or devices for fixing a pyrotechnic valve, because it is installed on existing and necessary conduits without special preparation of the latter. It may, in addition, be installed very late in the manufacturing cycle of the satellite and may become a standardised component of this manufacture, enabling the unit cost thereof to be reduced.

The collar enclosing the conduit bears a pyrotechnic cartridge for perforation that is capable of perforating a target, in the given case the conduit, along a predetermined axis. In general, these cartridges are cylindrically shaped, and the perforation is effected along the axis of the cylinder. By a cartridge being placed in an appropriate compartment of the collar and by the axis of the cartridge being directed in the radial direction with respect to the axis of the conduit, in a plane orthogonal to this axis, the perforation generated by the cartridge is effected diametrically in relation to the conduit, at least through a first wall thickness of said conduit.

Advantageously and according to a first variant of the invention, the pyrotechnic cartridge for perforation is suitable to perforate two wall thicknesses of the conduit, and the anvil is suitable to collect debris generated by a perforation right through the conduit.

The possible projections generated by the perforation, whether they be, in the given case, projectile debris or debris of the conduit itself, are projected onto an anvil inserted into the collar in a position diametrically opposed to the cartridge in relation to the axis of the conduit. The anvil is a metallic part that is capable of stopping the debris and/or the projectiles and of retaining said debris at least partly without creating additional debris. To this end, the surface of the anvil receiving the projections may be smooth or notched.

In this way, the draining device according to the invention perforates right through a conduit in communication with the tank, and the fluid under pressure of the tank is able to escape through the holes created in this way until the internal and external pressures of the tank are counterbalanced.

Advantageously and according to a second variant of the invention, the pyrotechnic cartridge for perforation is suitable to perforate at least a first wall thickness of the conduit, and the anvil is applied against the wall of the conduit diametrically opposed to the pyrotechnic cartridge, in order to limit the perforation of the second thickness of the wall. In this variant the anvil is pressed against the external wall of the conduit, opposite the pyrotechnic cartridge, and reinforces this wall in order to save it from being perforated. This arrangement enables the possible debris to be trapped inside the conduit.

Advantageously and according to the invention, the pyrotechnic cartridge for perforation is suitable to fire a perforating projectile. In a first embodiment the perforation of the conduit is implemented by a projectile, for example a bullet, that is particularly suitable, both in its kinetic energy and in its composition (diameter, hardness, etc.), to perforate one or two thicknesses (front and back) of the wall of the conduit while generating the least possible debris.

Advantageously and according to the invention, the pyrotechnic cartridge for perforation is a charge that is suitable to form by explosion a penetrating projectile, called explosively formed penetrator (EFP). These charges, known in themselves, generate projectiles having very high energy that are particularly well suitable to pierce walls and that have a very low, this being particularly favourable in the space environment.

Advantageously and according to the invention, the pyrotechnic cartridge for perforation is a shaped charge that is capable of generating a perforating jet of energy. In this second embodiment it is no longer a projectile which perforates the conduit but rather a concentrated jet of energy, oriented within the axis of the charge. The very great capacity of this type of charge for perforation at short distance is advantageously matched by a very low generation of debris by the charge itself, the debris generated originating essentially from the perforated conduit.

Advantageously and according to the invention, the pyrotechnic cartridge includes exclusively secondary explosive materials. These materials are advantageously much more stable than primary explosives, and their service life is by far longer. In addition, this choice simplifies the design, particularly so far as the aspects of operational security are concerned, by eliminating the necessity to install safe and arm devices.

Advantageously and according to the invention, the pyrotechnic cartridge for perforation is suitable to be triggered by an electrical or optical signal. The drainage of the tank(s) is controlled in guided manner, for example by a command transmitted from the ground. The priming of the pyrotechnic cartridge is then implemented by an electrical discharge or by a vaporisation of a metallic filament between two electrodes or by a laser beam transmitted by an optical fibre, for example.

Advantageously and according to the invention, the device includes at least one evacuation chamber extending over at least a part of the perimeter of the conduit around an axis linking the pyrotechnic cartridge to the anvil, each chamber being delimited by two support lips, placed respectively on either side of the chamber along the axis of the conduit, and linked to the external environment by at least one exhaust port. The evacuation chamber enables the fluid escaping from the perforated conduit to expand and to escape through the exhaust ports towards the external environment (in the given case, the space vacuum). A single chamber may be provided over the entire periphery of the conduit or may be implemented in the form of two chambers on either side of the conduit, opposite each perforation created in the conduit. The collar of the device according to the invention is maintained in position and tightened on the conduit by two continuous or discontinuous support lips surrounding the conduit on either side of the evacuation chamber along the axis of the conduit.

Advantageously and according to the invention, each exhaust port exhibits an axis parallel to the axis of the conduit. By exhaust ports being implemented preferentially in the form of cylindrical holes or in the form of indentations in the support lips on either side of the evacuation chamber, the flow of fluid escaping from the draining device is directed orthogonally in relation to the flow escaping through the perforations of the conduit. This, on the one hand, enables the reaction forces linked to the escape of gas under pressure to be balanced and, on the other hand, enables a baffle to be formed aiming to confine in the evaluation chamber any debris that could have been generated by the perforation and/or the projectile (as the case may be) and not picked up by the anvil. Moreover, the exhaust ports may themselves be formed in such a manner as to constitute baffles and prevent the scattering of debris.

Advantageously and according to the invention, the evacuation chamber exhibits, the opposite explosively formed penetrator (EFP), a suitable width, to enable the formation of the penetrating projectile. In practice, the transformation of a concave cap closing the charge into a convex projectile that is suitable to perforate a wall necessitates a space for free displacement of the projectile amounting to a few millimetres for the charge diameters being considered. In this way the evacuation chamber forms the necessary space for free displacement.

The invention also concerns a draining device characterised in combination by all or some of the characteristics mentioned above or below.

BRIEF DESCRIPTION OF THE DRAWINGS FIGURES

Other objectives, characteristics and advantages of the invention will become apparent from the description that follows and from the appended drawings, in which:

FIG. 1 is a cross section, orthogonal to the axis of the conduit, of the device according to a preferential variant of the invention, including an explosively formed penetrator (EFP), in its initial state;

FIG. 2 is a cross section, through a plane passing through the axis of the conduit, of the device according to the invention shown in FIG. 1;

FIG. 3 is the same section as that represented in FIG. 2, after the firing of the charge.

DETAILED DESCRIPTION OF THE INVENTION

The draining device 1 represented in FIGS. 1 and 2 includes a collar 4, in general made of titanium or of stainless steel, constituted by two half-bushes 4a and 4b enclosing a conduit 2 in communication with a tank (not represented) containing a fluid under pressure, for example a pressurisation fluid such as helium or nitrogen for pressurising tanks of propellants of a satellite, or containing said propellants under pressure. The collar 4 is preferably placed as close as possible to the tank but, according to the case, it may be placed at any point on the conduit, at the place where the required space constraints are least stringent. The two half-bushes 4a and 4b are fixed to one another by means of tightening screws 3 of the collar 4. The collar 4 is maintained on the conduit 2 by support lips 13 which delimit a chamber, called the evacuation chamber 9, in the direction of the axis of the conduit. The support lips 13 are pierced by exhaust ports 10, the axis of which is parallel to the axis of the conduit 2. The exhaust ports 10 may also be formed by indentations of the support lips 13. The exhaust ports 10 link the interior of the evacuation chamber 9 to an external environment which, in the given case, is the space vacuum when the satellite is in orbit.

The collar 4 bears within the half-bush 4a a pyrotechnic cartridge 5, represented in the illustrated example by a charge, called the explosively formed penetrator (EFP), that is suitable to form a penetrating projectile that is capable of perforating right through the conduit 2. In general, the pyrotechnic cartridge 5 includes a metallic envelope 5a of cylindrical shape, closed at one end by a wall 5b. The pyrotechnic cartridge 5 is placed in the collar 4 in such a manner that the axis of the cartridge passes through the axis of the conduit 2 in a plane orthogonal to said axis. The pyrotechnic cartridge 5 is filled with an explosive material 7 preferably chosen from the so-called secondary explosives, such as hexogen (RDX) or octogen (HMX), which are characterised by their stability. The cartridge is closed opposite the wall 5b by a concave cap 6, the concavity of which is turned towards the conduit 2. The cartridge also includes a detonator 8 that is suitable to cause the explosive material 7 to detonate when it receives a command such as an electrical or optical signal. In known manner, such a pyrotechnic cartridge 5 expels the cap 6 at the time of detonation of the explosive material 7. The cap 6 is deformed and passes from its concave shape to a convex shape forming a projectile 14 displaced at an extremely high speed which imparts to it a considerable perforating power. It is generally considered that such a projectile 14 is able to perforate a thickness of metal up to once the diameter of the cap 6, depending on the material of said cap.

The collar 4 also bears within the half-bush 4b an anvil 11 placed diametrically opposed to the pyrotechnic cartridge 5 in relation to the axis of the conduit 2.

In a first variant of the device according to the invention the anvil 11 is placed at a distance from the conduit 2, and an evacuation chamber 9 is formed between the two.

The material and the thickness of the anvil 11 are suitable to enable the projectile 14 to be stopped after it has perforated the two thicknesses 2a and 2b of the wall of the conduit 2. The surface of the anvil 11 opposite the conduit 2 may also exhibit a suitable relief (for example, notches), so that the projectile 14 is embedded in the anvil 11 and is not transformed into debris that is capable of drifting in zero gravity. Similarly, there is provision that the possible debris resulting from the perforation of the wall and carried along by the projectile 14 (or the jet of energy generated by a shaped charge) is projected onto the anvil 11 and immobilised there.

In a second variant of the device according to the invention (not represented) the anvil 11 is laid against the conduit 2, and the evacuation chamber 9 between the anvil and the conduit does not exist. The anvil then has the function of reinforcing the wall of the conduit opposed to the pyrotechnic cartridge 5 in such a manner as to avoid perforation right through the conduit. In this variant a single side of the conduit is perforated, therefore the discharge is limited but the debris generated by the perforation and, as the case may be, by the projectile 14 is confined within the conduit 2.

As represented in FIG. 3, relating to the first variant of the device, when it is necessary to undertake the drainage of the tank an appropriate command is transmitted to the detonator 8. This command may be triggered by a station on the ground and relayed by the electronics on board of the satellite in the form of a signal that is capable of priming the detonator 8. Depending on the type of detonator, the signal may be of electrical nature, such as an electrical discharge at high voltage, bringing about an electric arc between two electrodes, or the vaporisation of a metallic filament, generating a plasma. The signal may also be of a different nature, for example an optical signal transporting a suitable amount of energy, such as a laser pulse transmitted by an optical fibre.

When this signal is received by the detonator 8, the explosive material 7 detonates and projects the cap 6 in the direction of the conduit 2. The cap is then transformed into a projectile 14 and crosses right through the conduit 2. In this way it brings about two diametrically opposed perforations 12 in the wall of the conduit. The projectile 14 then comes to crash on the anvil 11 which prevents it from traversing the collar 4.

The fluid under pressure contained in the tank then escapes through the perforations 12 into the evacuation chamber 9 and then through the exhaust ports 10. The possible debris generated at the time of perforation, whether debris originating from the projectile 4 or from the walls of the conduit 2, remains trapped in the evacuation chamber 9, owing to the baffle formed by the exhaust ports 10.

The functioning described above remains appreciably the same with a pyrotechnic cartridge 5 formed by a socket filled with explosive material and a perforating bullet crimped at the end of the socket opposite the conduit. The bullet then constitutes the projectile 14 and perforates the conduit 2 before crashing on the anvil 11.

A person skilled in the art may also adapt the collar 14 to receive a pyrotechnic cartridge 5 in the form of a shaped charge. A shaped charge is similar in its composition to an explosively formed penetrator (EFP) as described above, with the exception of the cap which is generally of conical shape, the vertex of which is directed towards the interior of the charge, and the edge of which is integral with the metallic envelope 5b. In a manner known in itself, at the time of detonation of the explosive material 7 the energy generated is focused by the cap which volatilises and generates a perforating jet of energy within the axis of the charge. This jet is then capable of perforating the conduit 2 in a manner appreciably identical to a perforation caused by a projectile. The power of the pyrotechnic cartridge is suitable so that the jet is able to perforate the conduit 2 and is stopped by the anvil 11 in such a manner as to remain confined within the collar 4.

Of course, this description is given solely by way of illustrative example, and a person skilled in the art will be able to make numerous modifications thereto without departing from the scope of the invention, such as, for example, defining various shapes of collars and/or diverse means for fitting the pyrotechnic cartridge in the collar, for example with introduction through the exterior into a suitable compartment in the collar 4 and fixing by a screw socket at the rear of the cartridge.

The invention is, in addition, not limited to use in the space domain but may extend to an type of industry in which there is cause to drain a volume of fluid under pressure, for example in aeronautics or in the chemical industry etc.

The invention claimed is:

1. A device (1) for draining a tank of fluid under pressure pertaining to a space system, said tank being in fluid communication with an engine or another tank through a conduit in which said fluid is able to circulate under normal operation,
wherein said device includes:
a collar that is suitable to enclose said conduit with said conduit in said fluid communication,
a pyrotechnic actuator installed in said collar and suitable to perforate said conduit (2), said pyrotechnic actuator comprising a pyrotechnic cartridge (5) for perforation of said conduit, oriented radially towards the conduit (2), and
an anvil (11) installed in said collar diametrically opposed to the cartridge in relation to the conduit,
wherein the pyrotechnic cartridge (5) for perforation is suitable to perforate at least a first wall thickness (2a) of the conduit (2) and wherein the anvil (11) is applied against the wall of the conduit diametrically opposed to the pyrotechnic cartridge, in order to limit the perforation of the second thickness (2b) of the wall.

2. A device (1) for draining a tank of fluid under pressure pertaining to a space system, said tank being in fluid communication with an engine or another tank through a conduit in which said fluid is able to circulate under normal operation,
wherein said device includes:
a collar that is suitable to enclose said conduit with said conduit in said fluid communication,
a pyrotechnic actuator installed in said collar and suitable to perforate said conduit (2), said pyrotechnic actuator comprising a pyrotechnic cartridge (5) for perforation of said conduit, oriented radially towards the conduit (2), and
an anvil (11) installed in said collar diametrically opposed to the cartridge in relation to the conduit, wherein,
said collar comprises first and second half-bushes (4a, 4b),
said pyrotechnic cartridge (5) for perforation being installed in said first half-bush (4a) and said anvil (11) being installed in said second half-bush (4b),
said conduit being an existing conduit in said fluid communication, said collar enclosing said conduit by each of said first and second half-bushes being placed on opposite sides of said conduit and then being fixed together to each other.

3. A device as claimed in claim 2, wherein the pyrotechnic cartridge (5) for perforation is suitable to fire a perforating projectile (14).

4. A device as claimed in claim 3, wherein the pyrotechnic cartridge (5) for perforation is a charge that is suitable to form said penetrating projectile (14), called explosively formed penetrator (EFP), by explosion.

5. A device as claimed in claim 4, wherein said device includes at least one evacuation chamber (9) extending over at least a part of the perimeter of the conduit (2) around an axis linking the pyrotechnic cartridge (5) to the anvil (11), each chamber being delimited by two support lips (13), placed respectively on either side of the chamber along the axis of an conduit, and linked to the external environment by at least one exhaust port (10).

6. A device as claimed in claim 5, wherein each exhaust port (10) exhibits an axis parallel to an axis of the conduit (2).

7. A device as claimed in claim 5, wherein the evacuation chamber (9) exhibits, opposite the explosively formed penetrator (EFP), a width that is suitable to enable the formation of the penetrating projectile (14).

8. A device as claimed in claim 2, wherein the pyrotechnic cartridge (5) for perforation is a shaped charge that is capable of generating a perforating jet of energy.

9. A device as claimed in claim 2, wherein the pyrotechnic cartridge (5) includes exclusively secondary explosive materials (7).

10. A device as claimed in claim 2, wherein the pyrotechnic cartridge for perforation is suitable to be triggered by an electrical or optical signal.

11. A device as claimed in claim 2, wherein said device includes at least one evacuation chamber (9) extending over at least a part of the perimeter of the conduit (2) around an axis linking the pyrotechnic cartridge (5) to the anvil (11), each chamber being delimited by two support lips (13), placed respectively on either side of the chamber along an axis of the conduit, and linked to the external environment by at least one exhaust port (10).

12. A device as claimed in claim 11, wherein each exhaust port (10) exhibits an axis parallel to an axis of the conduit (2).

13. A device (1) for draining a tank of fluid under pressure pertaining to a space system, said device comprising:
a collar that encloses a conduit in fluid communication with said tank containing said fluid under pressure, wherein said tank is one of the group consisting of an engine and another tank;
a pyrotechnic actuator installed in said collar, said pyrotechnic actuator comprising a pyrotechnic cartridge (5) suitable to perforate said conduit (2) and create a perforation in said conduit, said pyrotechnic cartridge oriented radially towards the conduit (2) adjacent a first wall thickness (2a) of the conduit (2); and
an anvil (11) installed in said collar diametrically opposed to the cartridge in relation to the conduit adjacent a second wall thickness (2b) of the conduit (2), the anvil collecting debris generated by the perforation in said conduit, wherein,
said collar comprises first and second half-bushes (4a, 4b),
said pyrotechnic cartridge (5) for perforation is installed in said first half-bush (4a) and said anvil (11) is installed in said second half-bush (4b), and
said collar enclosing said conduit in fluid communication by each of said first and second half-bushes being placed on opposite sides of said conduit and then being fixed together to each other.

14. A device as claimed in claim 13, wherein the pyrotechnic cartridge (5) is suitable to perforate at least the first wall thickness (2a) of the conduit (2) and the anvil (11) limits perforation of the second thickness (2b) of the wall.

* * * * *